(12) United States Patent
Roersma et al.

(10) Patent No.: US 11,159,419 B1
(45) Date of Patent: Oct. 26, 2021

(54) POLICY-DRIVEN DATA LOCALITY AND RESIDENCY

(71) Applicant: Netskope, Inc., Santa Clara, CA (US)

(72) Inventors: Jacob S. Roersma, Ada, MI (US); Bryan D. Black, Norton Shores, MI (US)

(73) Assignee: Netskope, Inc., Santa Clara, CA (US)

( * ) Notice: Subject to any disclaimer, the term of this patent is extended or adjusted under 35 U.S.C. 154(b) by 0 days.

(21) Appl. No.: 17/163,260

(22) Filed: Jan. 29, 2021

(51) Int. Cl.
| | |
|---|---|
| *G06Q 10/10* | (2012.01) |
| *H04L 12/715* | (2013.01) |
| *H04L 29/06* | (2006.01) |
| *H04L 29/08* | (2006.01) |
| *G06F 9/451* | (2018.01) |
| *G06Q 30/02* | (2012.01) |
| *G06Q 50/26* | (2012.01) |
| *G06Q 30/00* | (2012.01) |

(52) U.S. Cl.
CPC ............ *H04L 45/04* (2013.01); *G06Q 10/10* (2013.01); *H04L 63/0281* (2013.01); *H04L 67/10* (2013.01); *G06F 9/451* (2018.02); *G06Q 30/018* (2013.01); *G06Q 30/0205* (2013.01); *G06Q 50/26* (2013.01); *H04L 63/029* (2013.01)

(58) Field of Classification Search
CPC ..... H04L 45/04; H04L 63/0281; H04L 67/10; G06Q 10/10; G06Q 30/018; G06Q 30/0205; G06Q 50/26
See application file for complete search history.

(56) References Cited

U.S. PATENT DOCUMENTS

| | | | |
|---|---|---|---|
| 8,285,685 B2 | 10/2012 | Prahlad | |
| 8,752,017 B2 | 6/2014 | Hossain | |
| 8,799,322 B2 | 8/2014 | deMilo | |
| 9,207,963 B2 | 12/2015 | Kruglick | |
| 9,213,858 B2* | 12/2015 | Sharma | H04L 9/0894 |
| 2013/0294318 A1* | 11/2013 | Amerga | H04W 4/06 370/312 |
| 2014/0280961 A1 | 9/2014 | Martinez | |
| 2014/0351606 A1 | 11/2014 | deMilo | |
| 2015/0139238 A1 | 5/2015 | Pourzandi | |
| 2015/0263891 A1 | 9/2015 | Baugher | |
| 2016/0139910 A1 | 5/2016 | Ramanathan | |
| 2016/0370775 A1 | 12/2016 | Daugherty | |
| 2017/0099188 A1 | 4/2017 | Chang | |

(Continued)

FOREIGN PATENT DOCUMENTS

| | | |
|---|---|---|
| CN | 104092565 B | 10/2014 |
| EP | 2577539 A1 | 4/2013 |

(Continued)

*Primary Examiner* — Wei Zhao
(74) *Attorney, Agent, or Firm* — Kilpatrick Townsend & Stockton, LLP (57) ABSTRACT

A method and system for policy-driven locality management of routes in cloud-based multi-tenant systems is disclosed. Policies are provided to end user devices to specify one or more locality and residency to either favor or avoid. Routes are provided to each end user device for the policies. When an application specifies a policy to use for a cloud service, the appropriate route(s) are provided to provide connectivity. Testing of the route is performed for compliance to provide telemetry. Where non-compliance is found, the routes are updated and distributed to the various end user devices.

20 Claims, 10 Drawing Sheets

(56) References Cited

U.S. PATENT DOCUMENTS

| | | |
|---|---|---|
| 2017/0264640 A1 | 9/2017 | Narayanaswamy |
| 2017/0310709 A1 | 12/2017 | Balupari |
| 2020/0153867 A1 | 5/2020 | Ithal |
| 2020/0162431 A1 | 5/2020 | Goldschlag |
| 2021/0014275 A1 | 1/2021 | Martinez |
| 2021/0075689 A1* | 3/2021 | Ramanathan ......... H04L 41/147 |

FOREIGN PATENT DOCUMENTS

| | | |
|---|---|---|
| WO | 2018044604 A1 | 3/2018 |
| WO | 2020060775 A1 | 3/2020 |

* cited by examiner

POLICY-DRIVEN DATA LOCALITY AND RESIDENCY

BACKGROUND

This disclosure relates in general to route management in cloud-based multi-tenant systems and, but not by way of limitation, to application-layer control on end user devices of routes.

A cloud access security broker (CASB) provides cloud security for an enterprise. As users move to zero footprint or cloud-based solutions, these different topologies have security and data residency concerns. Enterprise data can move between cloud providers who have distributed networks across the world. Security issues arise with distributed cloud storage and processing.

Data flows for a CASB are regulated with a global cloud traffic controller (GCTC). Routing between clouds and within a particular cloud are controlled by the GCTC. Each cloud provider is different with varying levels of control allowed for their data flows. Different countries have different security risks to data that might reside on servers there. For example, some sovereigns require governmental access to information upon request.

Multi-protocol label switching (MPLS) is used by the GCTC to route traffic as it travels from one network node to the next. MPLS provides application support such as virtual private networks (VPN), traffic engineering (TE) and quality of services (QoS). Packets are directed using an assigned label for a predetermined path through the network to provide a higher order control than done in packet switched networks unlike internet protocol (IP) routing where each data packet can determine its own path through the network. MPLS allows assigning different QoS characteristics and priorities for data flows while specifying fallback paths if rerouting is necessary.

SUMMARY

In one embodiment, embodiments of methods and systems for policy-driven locality management of routes in cloud-based multi-tenant systems is disclosed. Policies are provided to end user devices to specify one or more locality and residency to either favor or avoid. Routes are provided to each end user device for the policies. When an application specifies a policy to use for a cloud service, the appropriate route(s) are provided to provide connectivity. Testing of the route is performed for compliance to provide telemetry. Where non-compliance is found, the routes are updated and distributed to the various end user devices.

In an embodiment, a cloud-based multi-tenant system for policy-driven locality route-management. The cloud-based multi-tenant system comprises a plurality of routes and an application. The plurality of routes is through a cloud-based multi-tenant system to deliver services to a plurality of end user devices. Each route is characterized by one or more of locality and residency. The plurality of routes is distributed to the plurality of end user devices in a plurality of domains. The plurality of routes terminate with a plurality of cloud services across the Internet. The plurality of domains separate subsets of the plurality of end user devices for a plurality of tenants. The plurality routes are specified for a plurality of policies. The application runs on an end user device of the plurality of end user devices that requests a policy chosen from the plurality of policies. The route of the plurality of routes corresponding to the policy is returned. Communication via the route between the application and a cloud service is performed according to the policy. Compliance with the policy is tested. Reporting telemetry according to the testing. The plurality of routes is updated based upon the telemetry.

In another embodiment, a method for policy-driven locality management of routes in cloud-based multi-tenant systems is disclosed. In one step, a plurality of routes is determined through a cloud-based multi-tenant system to deliver services to the plurality of end user devices. Each route is characterized by one or more of locality and residency. The plurality of routes to the plurality of end user devices in a plurality of domains is distributed. The plurality of routes terminate with a plurality of cloud services across the Internet. The plurality of domains separate subsets of the plurality of end user devices for a plurality of tenants. The routes are specified for a plurality of policies. Selection of a policy chosen from the plurality of policies is received from an application running on an end user device of the plurality of end user devices. A route of the plurality of routes corresponding to the policy is returned. Communication via the route between the application and a cloud service is according to the policy. Testing compliance with the policy. Reporting telemetry according to the testing. Updating the plurality of routes based upon the telemetry.

In one embodiment, a cloud-based multi-tenant system for policy-driven locality route-management, the cloud-based multi-tenant system comprising one or more processors and one or more memories with code for:
  determining a plurality of routes through a cloud-based multi-tenant system to deliver services to the plurality of end user devices, wherein each route is characterized by one or more of locality and residency;
  distributing the plurality of routes to the plurality of end user devices in a plurality of domains, wherein the plurality of routes terminate with a plurality of cloud services across the Internet, the plurality of domains separate subsets of the plurality of end user devices for a plurality of tenants, and the routes are specified for a plurality of policies;
  receiving from an application running on an end user device of the plurality of end user devices selection of a policy chosen from the plurality of policies;
  returning a route of the plurality of routes corresponding to the policy; and
  communicating via the route between the application and a cloud service according to the policy;
  testing compliance with the policy;
  reporting telemetry according to the testing; and
  updating the plurality of routes based upon the telemetry.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Figure 1:
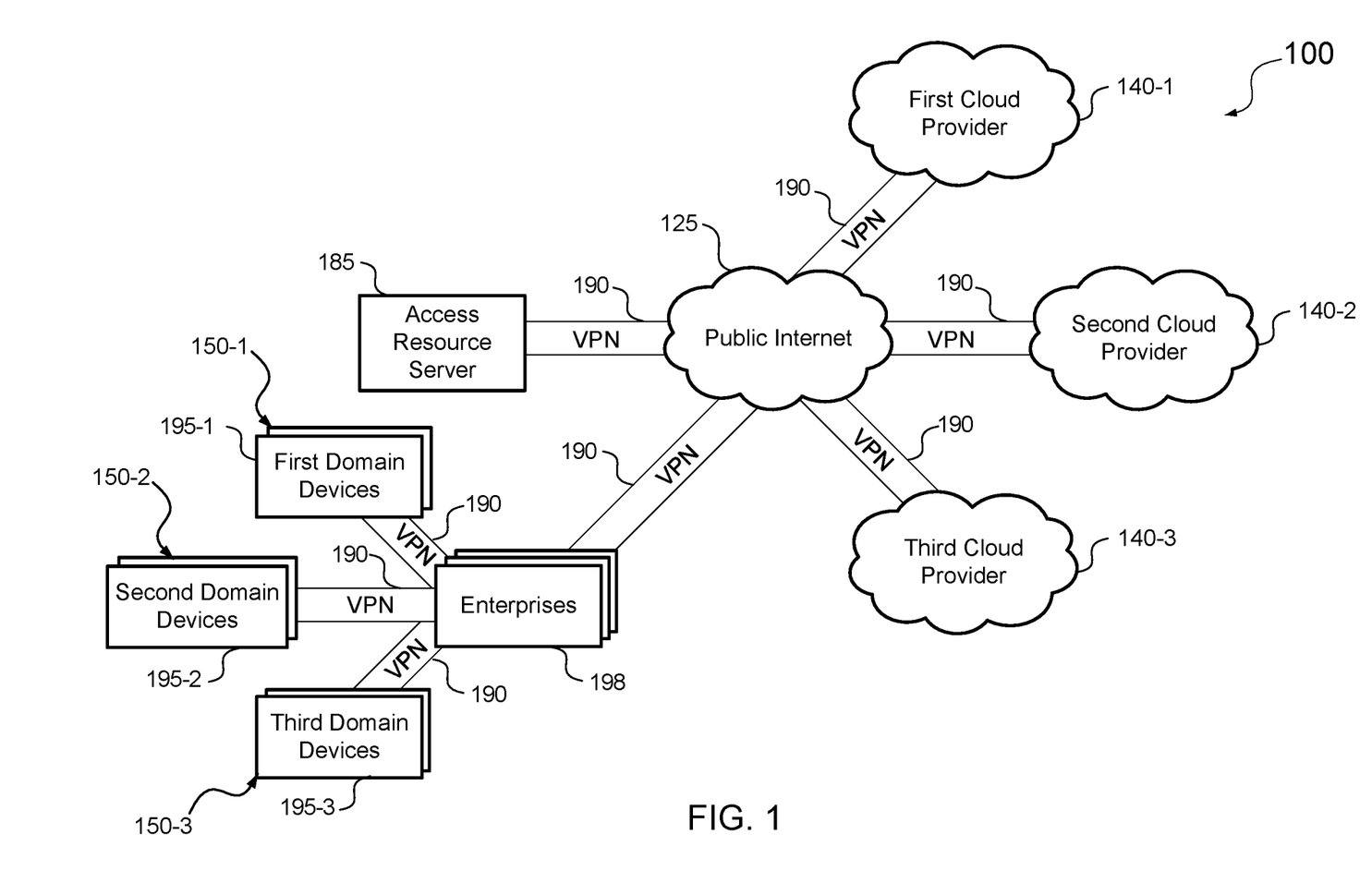
FIG. 1 depicts a block diagram of an embodiment of a cloud network allowing multiple-tenants in different domains to communicate with various cloud providers over the public internet.

Referring first to FIG. 1, a block diagram of an embodiment of a cloud network 100 allowing multiple-tenants in different domains to communicate with various cloud providers over the public internet is shown. The cloud network 100 allows multiple tenants or enterprises to all use the same network separated by domain or some other logical separation. Encryption, leased/encrypted tunnels, firewalls, and/or gateways can be used to keep the data from one enterprise 198 separate from other enterprises 198. Each end user device 195 can communicate with cloud providers 140 of services and storage using a public internet 125. An access resource server 185 provides multi-tenancy control, policies and routing for each domain.

The cloud network 100 may include a first computing environment 150-1 having end user devices 195-1 for a first domain, a second computing environment 150-2 having end user devices 195-2 for a second domain, and a third computing environment 150-3 having end user devices 195-3 for a third domain. Each domain communicates with its respective enterprise 198 using a virtual private network (VPN) 190 over local area networks (LANs), wide area networks (WANs), and/or the public Internet 125. Instead of a VPN 190 as an end-to-end path, tunneling (e.g., IP-in-IP, GRE), policy-based routing (PBR), BGP/IGP route injection, or proxies could be used. The first cloud provider 140-1, the second cloud provider 140-2, and the third cloud provider 140-3 may be public or private clouds. Some examples of the cloud providers 140 include Amazon Web Services (AWS)®, Google Cloud Platform (GCP)®, and Microsoft Azure®. Some or all of the cloud providers 140 may be different from each other, for example, the first cloud provider 140-1 may run Amazon Web Services (AWS)®, the second cloud provider 140-2 may run Google Cloud Platform (GCP)®, and the third cloud provider 140-3 may run Microsoft Azure®. Although three cloud providers 140 are shown, any suitable number of cloud providers 140 may be provided with some captive to a particular enterprise or otherwise not accessible to multiple domains.

Each of the cloud providers 140 may communicate with the Internet 125 using a secure connection. For example, the first cloud provider 140-1 may communicate with the public Internet 125 via a virtual private network (VPN) 190, the second cloud provider 140-2 may communicate with the public Internet 125 via a different VPN 190, and the third cloud provider 140-3 may communicate with the public Internet 125 via yet another VPN 190. Some embodiments could use leased connections or physically separated connections to segregate traffic. Although one VPN 190 is shown, it is to be understood that there are many VPNs to support different end user devices, tenants, domains, etc.

A plurality of enterprises 198 may also communicate with the public Internet 125 and the end user devices 195 for their domain via VPNs 190. Some examples of the enterprises 198 may include corporations, educational facilities, governmental entities, and private consumers. Each enterprise may support one or more domains to logically separate their networks. The end user devices 195 for each domain may include individual computers, tablets, servers, handhelds, and network infrastructure that are authorized to use computing resources of their respective enterprise 198.

Further, an access resource server (ARS) 185 (or mid-link server) may communicate with the public Internet 125 via a VPN 190. The ARS 185 also provides cloud access security broker (CASB) functionality for cloud security to enterprises 198 with data flows of the CASB being regulated with a global cloud traffic controller (GCTC). Communication between the ARS 185 and cloud providers 140 for a given enterprise 198 can be either a VPN connection or tunnel depending on preference of the enterprise 198. The ARS 185 may configure, test, and enforce policies and routing across the cloud network 100. For example, the ARS 185 may ensure that the policies are consistent across the cloud providers 140, enterprises 198 and computing environments 150. The ARS 185 provides proxies to cloud providers and may apply various policies. The connection between end user devices 195 and the ARS 185 is over an encrypted VPN or tunnel.

Figure 2:
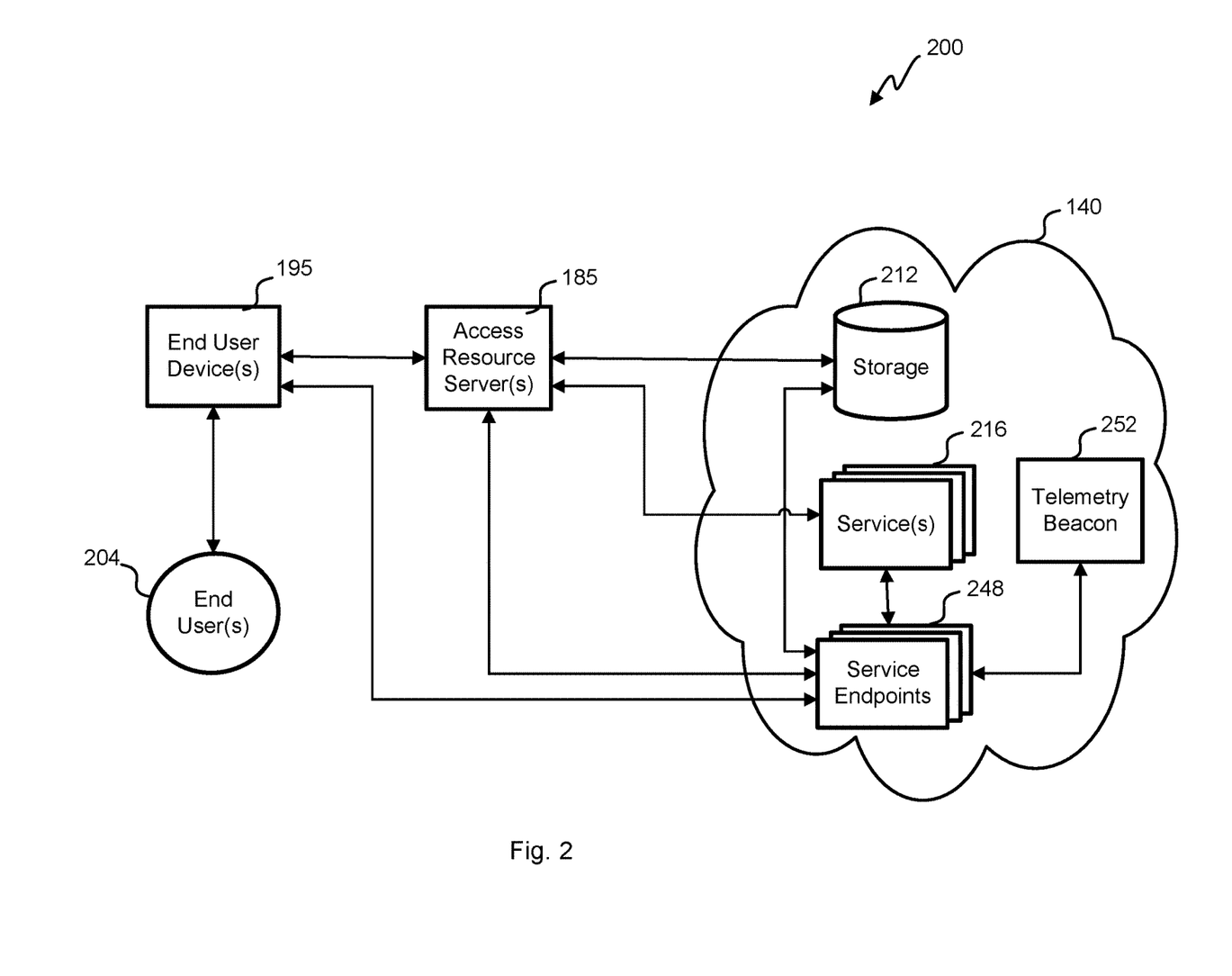
FIG. 2 depicts a block diagram of an embodiment of a portion of a cloud network where an end user device communicates with a cloud provider.

With reference to FIG. 2, a block diagram of an embodiment of a single-tenant cloud network 200 where an end user device 195 communicates with a cloud provider 140 is shown. The end user device 195 is operated by an end user 204. The cloud provider 140 is accessible directly or through the ARS 185 depending on the route chose, services, policies, etc. Included in the cloud provider 140 are services 216 such as storage 212 that enable applications and functionality on the end user devices 195.

Service endpoints 248 are provided in the cloud provider 140 to enable communication with the ARS 185 and end user devices 195. Service endpoints 248 may include VPN terminations and proxies that provide for a secure tunnel with the ARS 185 and/or end user devices 195. The ARS 185 can optionally connect directly with services 216 and storage 212 of the cloud provider 140 without using the service endpoints 248. In some cases, the end user device 196 communicates with the services 216 and storage 212 through the ARS 185 depending on route preference and policies.

When services 216, storage 212 or other functionality is deployed in a cloud provider 140, a telemetry beacon 252 is also deployed. Routes, storage and services implemented in a cloud provider 140 can be configured to specify residency, routing, and performance settings. For example, a database may be instantiated for a tenant that requires data storage in the U.S. with a certain response time. Even after configuration, the telemetry beacon 252 will monitor compliance with the specified residency, routing, and performance settings. The compliance telemetry is sent to the ARS 185. Through configuration or policy selection, the enterprises 198 can configure which events are emitted as telemetry for reporting and alerting purposes. Updated configuration from the ARS 185 may mediate the non-compliance once uncovered. Telemetry gathering software and/or hardware can reside on the end user device 195, ARS 185, and/or cloud provider 140 in different embodiments.

Figure 3:
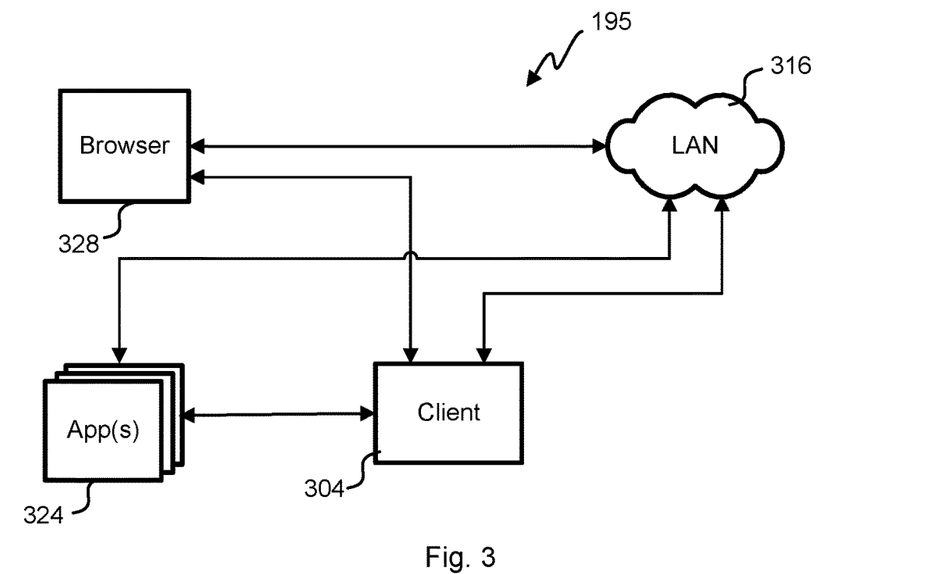
FIG. 3 depicts a block diagram of an embodiment of an end user device that includes a client for enabling enhanced routing control.

Referring next to FIG. 3, a block diagram of an embodiment of an end user device 195 that includes a client 304 for enabling enhanced routing control is shown. The end user device 195 includes applications 324 and a browser 328 that use the client 304 for communication over the LAN 316 and ultimately to cloud providers 140 (not shown). The browser 328 and apps 324 can be redirected using domain name services (DNS) to use the client 304. Alternatively, the browser 328 and apps 324 may natively support the client 304 to utilize APIs or other communication to select policies and receive the corresponding routes.

Figure 4:
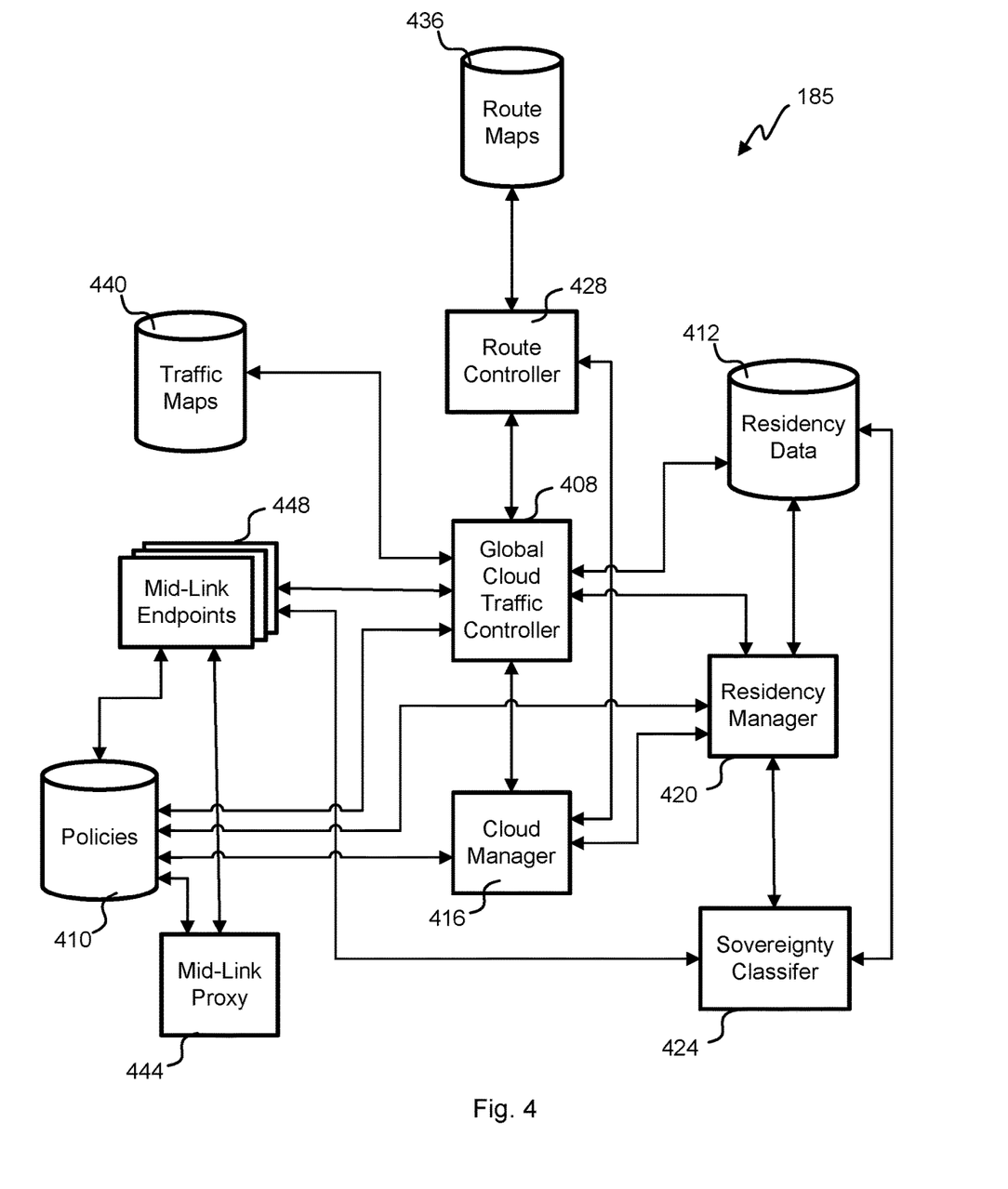
FIG. 4 depicts a block diagram of an embodiment of an application resource server (ARS) that provides traffic and residency management.

With reference to FIG. 4, a block diagram of an embodiment of the ARS 185 that provides traffic and residency management is shown. Connections are made with the ARS 185 using mid-link endpoints 448 and/or mid-link proxies 444 to various end user devices 195 and cloud providers 140. Policies 410 are used to define how the cloud network 100 operates including various functions within the ARS 185, for example, what type of connections are allowed with the ARS 185. For example, the policies 410 may require each end user device 195 to have recently run anti-virus software and other security measures before allowing connection through a mid-link endpoint 448. The policies 410 operate in the higher levels of the Open Systems Interconnection (OSI) model, such as the application layer to provide enhanced control.

A cloud manager 416 configures the various cloud providers 140 (not shown) as per the data residency requirements of each tenant. To support the policies 410, the cloud manager 416 has scripts or routines with commands, configuration and/or API calls that manage each cloud provider 140 according to their unique interface to cause a compliant set of services and/or routes to be configured. Policies 410 selected by the enterprise 198 and client 304 communicate to the ARS 185 to control residency for cloud services and routes. For example, a tenant may need a server instance with a database spun-up. Further, the tenant may specify by policy communicated to the ARS 185 that the server of the cloud provider 140 reside on Canadian servers, but that the database be within the United States. The policy 410 may also dictate to a route controller 428 the residency of the route to use that could result in the cloud manager 416 performing additional configuration of the cloud provider 140. The cloud manager 416 interprets the policies 410 supported for each tenant and configure the cloud provider to support those services and routes according to those residency requirements that the policies may specify.

There are commonly concerns about where data will reside, be processed and traverse while routed. For example, classified data for the United States cannot be stored on servers outside the country. Some cloud providers 140 allow specifying residency for services, but not for routing data. It would not be unusual for a database in Canada to be backed up to resources in the United States. When deploying services, the residency manager 420 configures the cloud provider 140 to specify residency. Residency data 412 is tracked and stored for all the services, routes and data where a residency policy is specified. Embedded in the provisioning of a service is telemetry beacon 252 that monitors residency and other things like performance and routing. Similarly, the end user device 195 reports telemetry on residency as observed from that perspective.

A sovereignty classifier 424 determines compliance with policies 410 with regard to residency and may gather its own telemetry from the cloud network 100. Those policies 410 can specify in which country or countries and/or regions data resides and is routed through. Telemetry from the ARS 185, end user devices 195 and telemetry beacons 252 in cloud providers 140 is gathered and stored in as residency data 412. The telemetry and testing function to confirm residency of services, storage and routes can be performed anywhere in cloud network 100. In some cases, two different nodes may test residency to confirm compliance, for example both the ARS 185 and client 304 could confirm the datalink between them conforms with a policy. Where non-compliance is detected, it is reported to the cloud manager 416 for remediation. In some cases, repeated violations are routed to a developer queue to work through the configuration settings for the cloud provider 140 so that configuration can properly comply with the residency policy. Where there is a violation, another cloud provider 140 that can be configured reliably is automatically switched over to until the problem is resolved.

A global cloud traffic controller 408 configures the cloud system 100 to support the various requests of tenants. The enterprises 198, end user devices 195, cloud providers 140 are all interconnected with VPNs 190, leased lines, encrypted tunnels, etc. to communicate with the ARS 185 and each other at the link layer while keeping the domains for each tenant separate from each other. Gateways, firewalls, routers, and network layer equipment are all configured by the global cloud traffic controller 408 to provide connectivity at the network layer.

Routing between various cloud services, enterprises 198 and end user devices 195 is arranged by a route controller 428. Different performance and residency for routes can be specified by the enterprise 198 according to the policy 412 selected by a tenant. Traffic maps 440 store performance and route maps store addresses and residency for each link.

Route maps 436 are maintained for paths between and within cloud providers, to/from enterprise locations, and to/from the ARS 185. With different configuration of the mid-link endpoints 448 and mid-link proxy 44, routes between nodes of the cloud network 100 can be changed. The cloud manager 416 can configure each cloud provider along with the service endpoints 248 to change the route. Route information can be sent to end user devices 195 to specify their PoP or endpoint to use to also affect the route. Route maps 436 are maintained for the different configurations for all tenants. Telemetry from the end user devise 195 and cloud providers 140 can test compliance with the policy so that remediation can be performed by the cloud manager 416 changing settings or even selecting a different cloud.

A global cloud traffic controler 408 knows the route maps 436 and has traffic maps 440 for all the connections in the cloud network 100. Traffic maps 440 for each link specify bandwidth, latency, reliability, and other performance characteristics. Performance preference can be specified by any enterprise 198 through selection of the appropriate policy. For example, there may be a policy that specifies less than 40 ms latency with a minimum bandwidth of 1 Gps. The global cloud traffic controller 408 controls how all the data connections of the cloud network 100 are configured to meet any policy requirements. Configuration is done for the end user devices 195, enterprises 198 and cloud providers 140. Telemetry information returned indicates compliance with the policies 410 and if any remediation is required.

Figure 5:
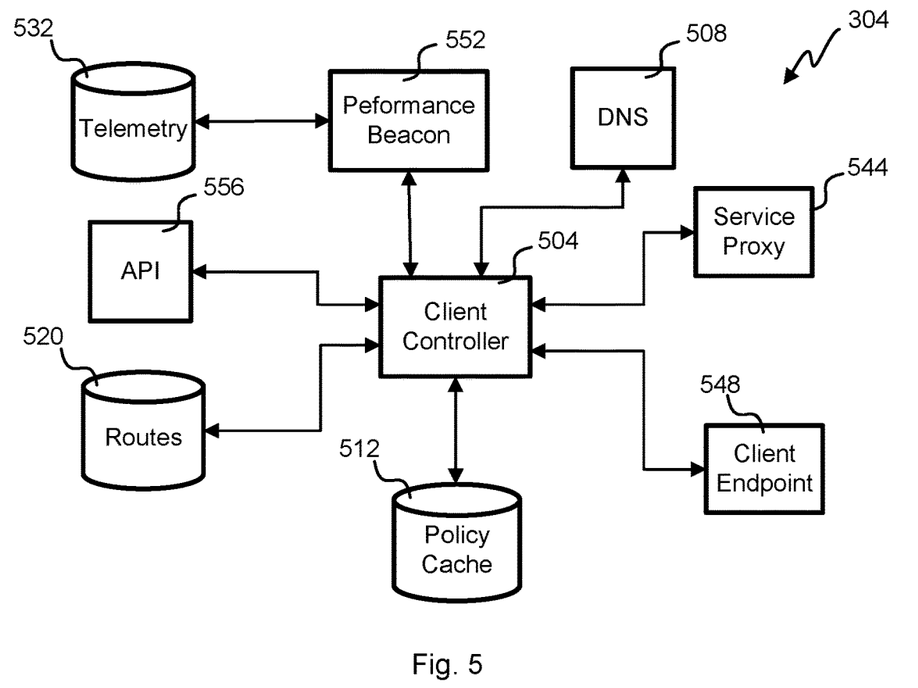
FIG. 5 depicts a block diagram of an embodiment of a client that can specify by policy routes to be used for cloud services.

Referring next to FIG. 5, a block diagram of an embodiment of a client 304 is shown that can specify by policy routes to be used for cloud services under the management of a client controller 504. The client controller 504 configures a DNS, fulfills API request, populates routes 520 and a policy cache 512. In operation, the client controller configures data and service requests over the cloud network 100.

The client 304 can be specified for use with a DNS 508 who redirects traffic from browsers 328 and apps 324 to go through the client 304. Without changing any apps 324 or the browser 328, the client 304 can process traffic for the cloud network 100. The client 304 can operate as a proxy using a service proxy 544 or a VPN using the client endpoint 548. An API 556 is provided for apps 324 to configure the client 304 if they have that capability. The ARS 185 can also configure the client 304.

The ARS 185 sends relevant policies 410 to the policy cache 512 to provide functionality to the client 304. The policies 410 allow specifying residency, performance and route for the client 304 to use. Table I gives examples of residency policies along with the target compliance rate before the residency manager 420 will remediate.

TABLE I

| Policy | Route | Compliance |
|---|---|---|
| Residency Policies ||| 
| USA Only | 185-1, 140-2 | 100% |
|  | 185-1, 140-1, 140-2 | 99% |
|  | 185-1, 185-2, 140-2 | 90% |
|  | 185-3, 140-3 | 70% |
| North America Preferred | 185-4, 140-6 | 60% |
| Avoid China, Cuba, N. Korea | 185-6, 140-5 | 100% |
|  | 185-7, 140-2 | 99% |
|  | 185-1, 140-3-140-1 | 95% |

Additionally, security checks needed as a condition to operation can be specified. For example, the policy 410 might specify that the traffic can only be routed through the United States and unless a route 520 has that residency guarantee, it should not be used. Table II shows different traffic policy examples along with the compliance threshold before the global cloud traffic controller 408 would remediate to regain compliance. Routes 520 are sent for the domain and enterprise 198 by the ARS 185 from its route maps 436.

TABLE II

| Policy | Route | Compliance |
|---|---|---|
| Traffic Policies ||| 
| Backend Performance | 185-1, 140-3 | 99% |
| Route Capacity | 185-3, 140-1 | 99.9% |
| Edge Ping Time | 185-2 | 99.9999% |
| End-to-End Latency | 185-4, 140-2 | 99.999% |
| Security | 185-5, 185-2, 140-6 | 99.99% |
| Route Availability | 185-9 | 99.99999% |

A performance beacon 552 monitors operation of the client 304 in compliance with specified policies to generate telemetry 532. The telemetry 532 is periodically or upon request provided to the ARS 185 for processing. Where non-compliance with a policy is determined, new routes 520, policies and configuration from the ARS 185 remediates the problem.

Figure 6A:
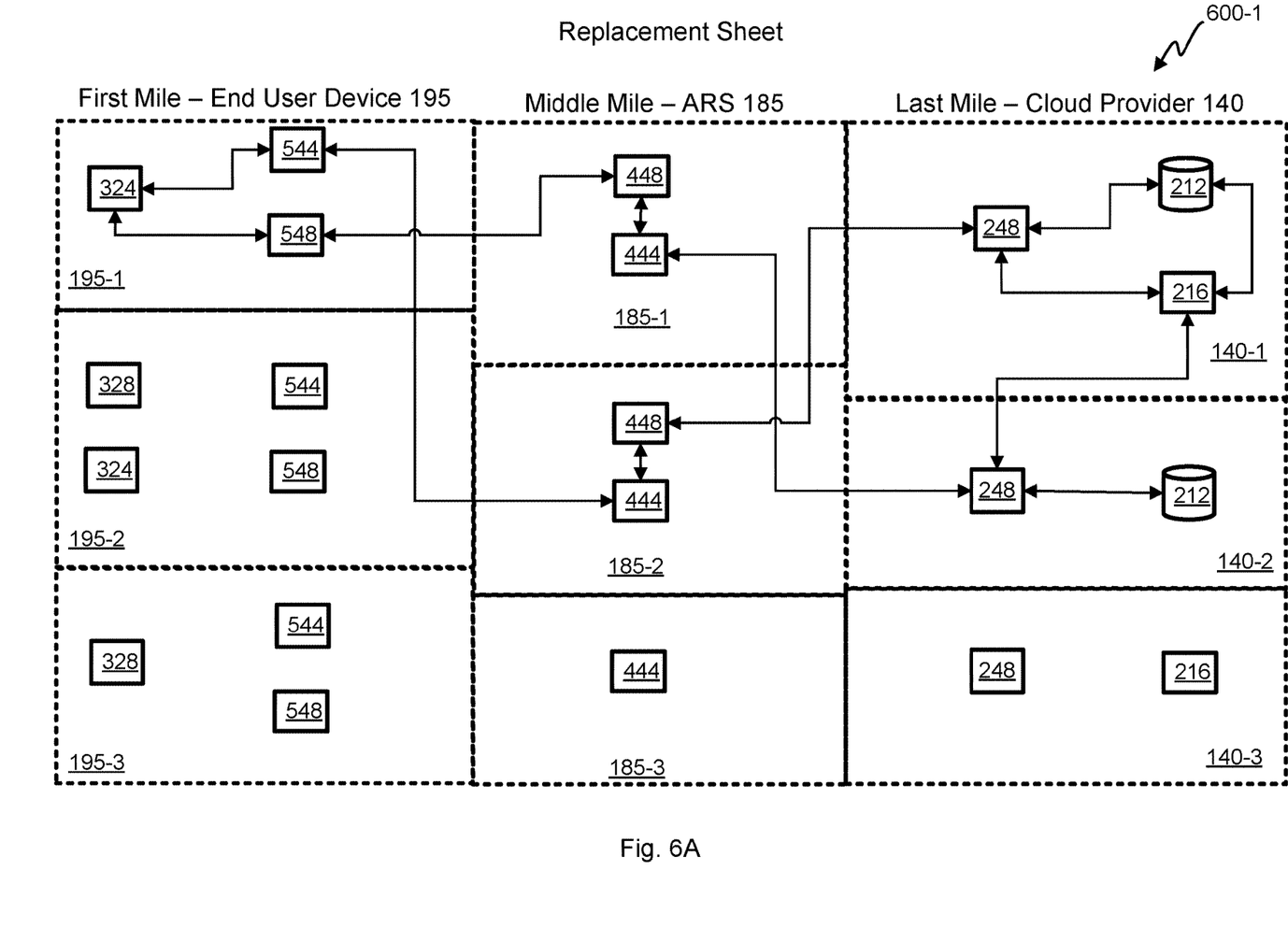
FIGS. 6A-6C depict block diagrams of embodiments of routing between end user devices and cloud services optionally using an ARS.
Figure 6B:
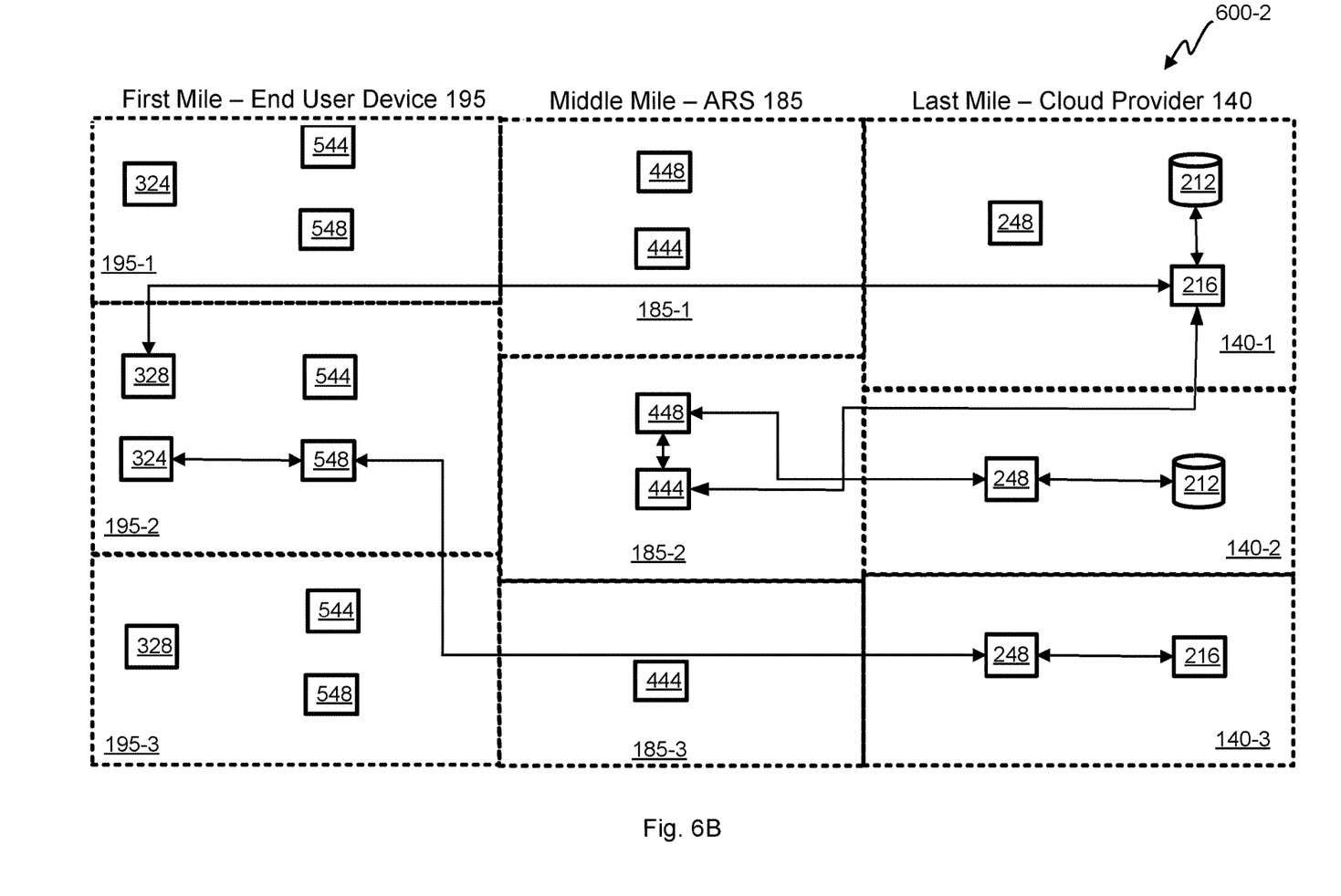
Figure 6C:
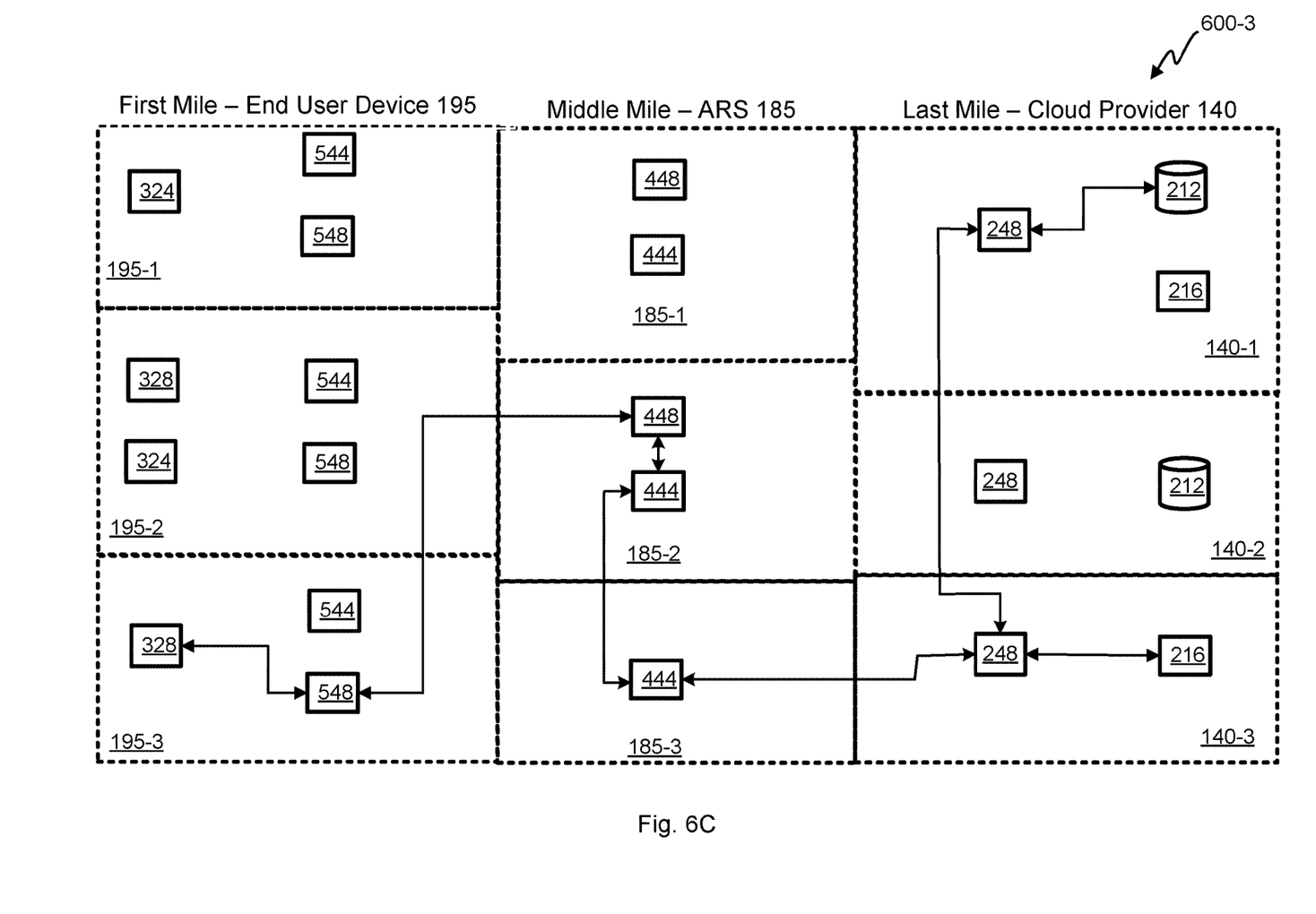

With reference to FIGS. 6A-6C, block diagrams of embodiments of routing between end user devices 195 and cloud services hosted by cloud providers 140 optionally using an ARS 185 are shown in various examples. Routes are dynamically configured according to policy requests at the client 324 according to performance, route and/or residency. All three of these example routes are supported simultaneously and could be separated in different domains for different tenants. During normal operation, millions of routes can use the cloud network 100 simultaneously.

Referring initially to FIG. 6A, a first app 324-1 on a first end user device 195-1 connects to a first and second cloud providers 140-1 and 140-2 to provide cloud services. The first cloud provider 140-1 provides a first service 216-1 and a first storage 212-1, but also utilizes a second storage 212-2 in a second cloud provider 140-2 with a route through a second service endpoint 248-2. A first app 324-1 uses a first service 216-1 with the first and second storage 212-1 and 212-2 from two cloud providers 140.

In this example, the first app 324-1 uses a proxy connection between a first service proxy 544-1 and a second mid-link proxy 444-2 for a second ARS 185-2 along with a VPN 190 connection between a second mid-link endpoint 448-2 and a first service endpoint 248-1 of the first cloud provider 140-1 to form a first route to a first service 216-1 and first storage 212-1. A second route from the first app 324-1 uses a VPN 190 connection between a first client endpoint 548-1 and a first mid-link endpoint 448-1 along with a proxy link between a first mid-link proxy 444-1 and a second service endpoint 248-2 to form a second route to a second storage 212-2. Both routes utilize ARS 185 mid-link in the route, but different ARSes 185. In this way, the first app 324-1 securely communicates with the first and second cloud providers 140-1, 140-2 for various cloud services.

With reference to FIG. 6B, a second end user computer 195-2 has a second browser 328-2 and second app 324-2 that communicate with three cloud providers 140-1, 140-2, 140-3 using the cloud network 100. The second browser 328-2 connects directly with a first service 216-1 on the first cloud provider 140-1, for example, a SaaS tool could be the first service 216-1. The first service 216-1 connects through the second ARS 185-2 to access second storage 212-2 on a second cloud 140-2. The second app 324-2 uses second client endpoint 548-2 to directly connect with a third service endpoint 248-3 to gain access to a third service 216 without using any ARS 185.

Referring next to FIG. 6C, a third end user computer 195-3 has a third browser 328-3 that uses a third service 216-3 that relies upon first storage 212-1 by utilizing two separate clouds 140-3, 140-1. Two ARS 185-2 185-3 are utilized in the route that comprises three links between the third browser 328-3 and third cloud 140-3, specifically, third client endpoint 548-3 VPN to second mid-link endpoint 448-2 and second mid-link proxy 444-2 proxy connection to third mid-link proxy 444-3 before proxy-linking to the third service endpoint 248-3. The third cloud 140-3 connects via the third service endpoint 248-3 to the first service endpoint 248-1 to get first storage 212-1 access.

Figure 7:
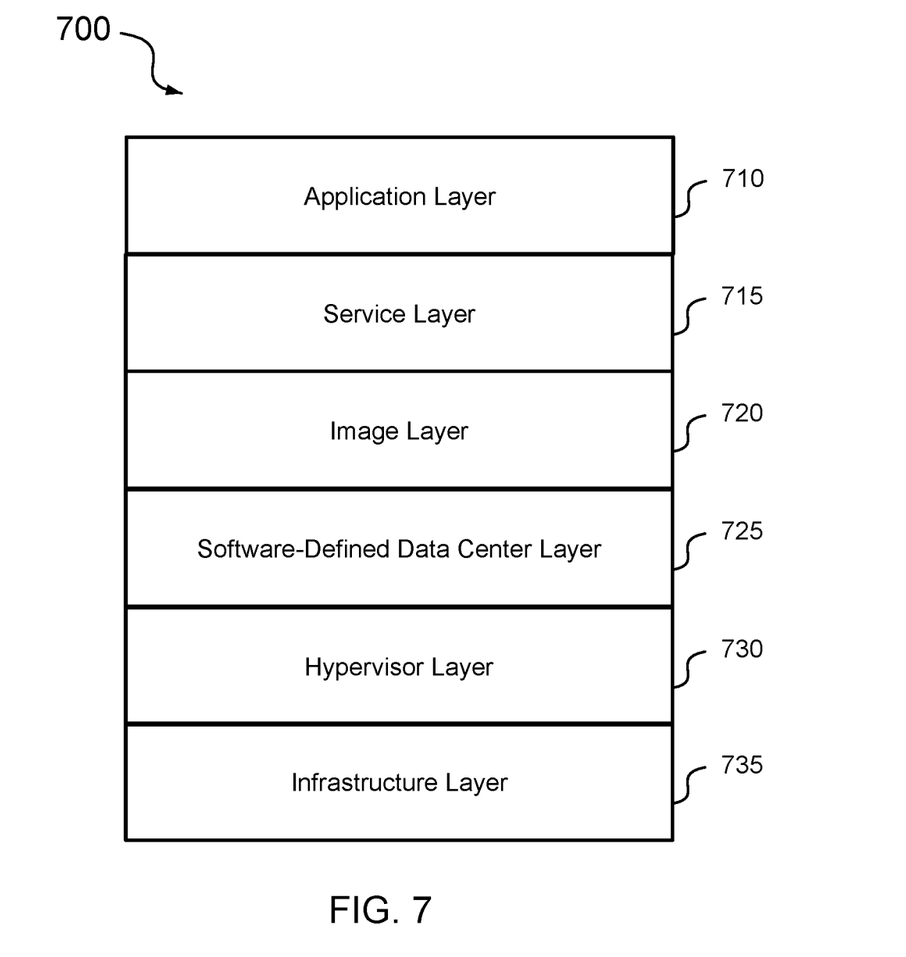
FIG. 7 depicts a block diagram of an embodiment of a cloud Open Systems Interconnection (OSI) model for cloud computing environments.

Referring next to FIG. 7, a block diagram of an embodiment of a cloud OSI model for cloud computing environments is shown. The cloud OSI model 700 for cloud computing environments partitions the flow of data in a communication system into six layers of abstraction. The cloud OSI model 700 for cloud computing environments may include, in order, an application layer 710, a service layer 715, an image layer 720, a software-defined data center layer 725, a hypervisor layer 730, and an infrastructure layer 735. Each layer serves a class of functionality to the layer above it and is served by the layer below it. Classes of functionality may be realized in software by various communication protocols.

The infrastructure layer 735 may include hardware, such as physical devices in a data center, that provides the foundation for the rest of the layers. The infrastructure layer 735 may transmit and receive unstructured raw data between a device and a physical transmission medium. For example, the infrastructure layer 735 may convert the digital bits into electrical, radio, or optical signals.

The hypervisor layer 730 may perform virtualization, which may allow the physical devices to be divided into virtual machines that can be bin packed onto physical machines for greater efficiency. The hypervisor layer 730 may provide virtualized compute, storage, and networking. For example, OpenStack® software that is installed on bare metal servers in a data center may provide virtualization cloud capabilities. The OpenStack® software may provide various infrastructure management capabilities to cloud operators and administrators, and may utilize the Infrastructure-as-Code concept for deployment and lifecycle management of a cloud data center. In the Infrastructure-as-Code concept, the infrastructure elements are described in definition files. Changes in the files are reflected in the configuration of data center hosts and cloud services.

The software-defined data center layer 725 may provide resource pooling, usage tracking, and governance on top of the hypervisor layer 730. The software-defined data center layer 725 may enable the creation virtualization for the Infrastructure-as-Code concept by using representational state transfer (REST) APIs. The management of block storage devices may be virtualized, and end users may be provided with a self-service API to request and consume those resources without requiring any knowledge of where the storage is actually deployed or on what type of device. Various compute nodes may be balanced for storage.

The image layer 720 may use various operating systems and other pre-installed software components. Patch management may be used to identify, acquire, install, and verify patches for products and systems. Patches may be used to correct security and functionality problems in software. Patches may also be used to add new features to operating systems, including security capabilities. The image layer 720 may focus on the compute instead of storage and networking. The instances within the cloud computing environments may be provided at the image layer 720.

The service layer 715 may provide middleware, such as functional components that applications use in tiers. In some examples, the middleware components may include databases, load balancers, web servers, message queues, email services, or other notification methods. The middleware components may be defined at the service layer 715 on top of particular images from the image layer 720. Different cloud computing environment providers may have different middleware components.

The application layer 720 may interact with software applications that implement a communicating component. The application layer 720 is the layer that is closest to the end user. Functions of the application layer 720 may include identifying communication partners, determining resource availability, and synchronizing communication. Applications within the application layer 720 may include custom code that makes use of middleware defined in the service layer 715.

Various features discussed above may be performed at one or more layers of the cloud OSI model 700 for cloud computing environments. For example, translating the general policies into specific policies for different cloud computing environments may be performed at the service layer 715 and the software-defined data center layer 725. Various scripts may be updated across the service layer 715, the image layer 720, and the software-defined data center layer 725. Further, APIs and policies may operate at the software-defined data center layer 725 and the hypervisor layer 730.

Each of the different cloud computing environments may have different service layers 715, image layers 720, software-defined data center layers 725, hypervisor layers 730, and infrastructure layers 735. Further, each of the different cloud computing environments may have an application layer 710 that can make calls to the specific policies in the service layer 715 and the software-defined data center layer 725. The application layer 710 may have substantially the same format and operation for each of the different cloud computing environments. Accordingly, developers for the application layer 710 may not need to understand the peculiarities of how each of the cloud computing environments operates in the other layers.

Figure 8:
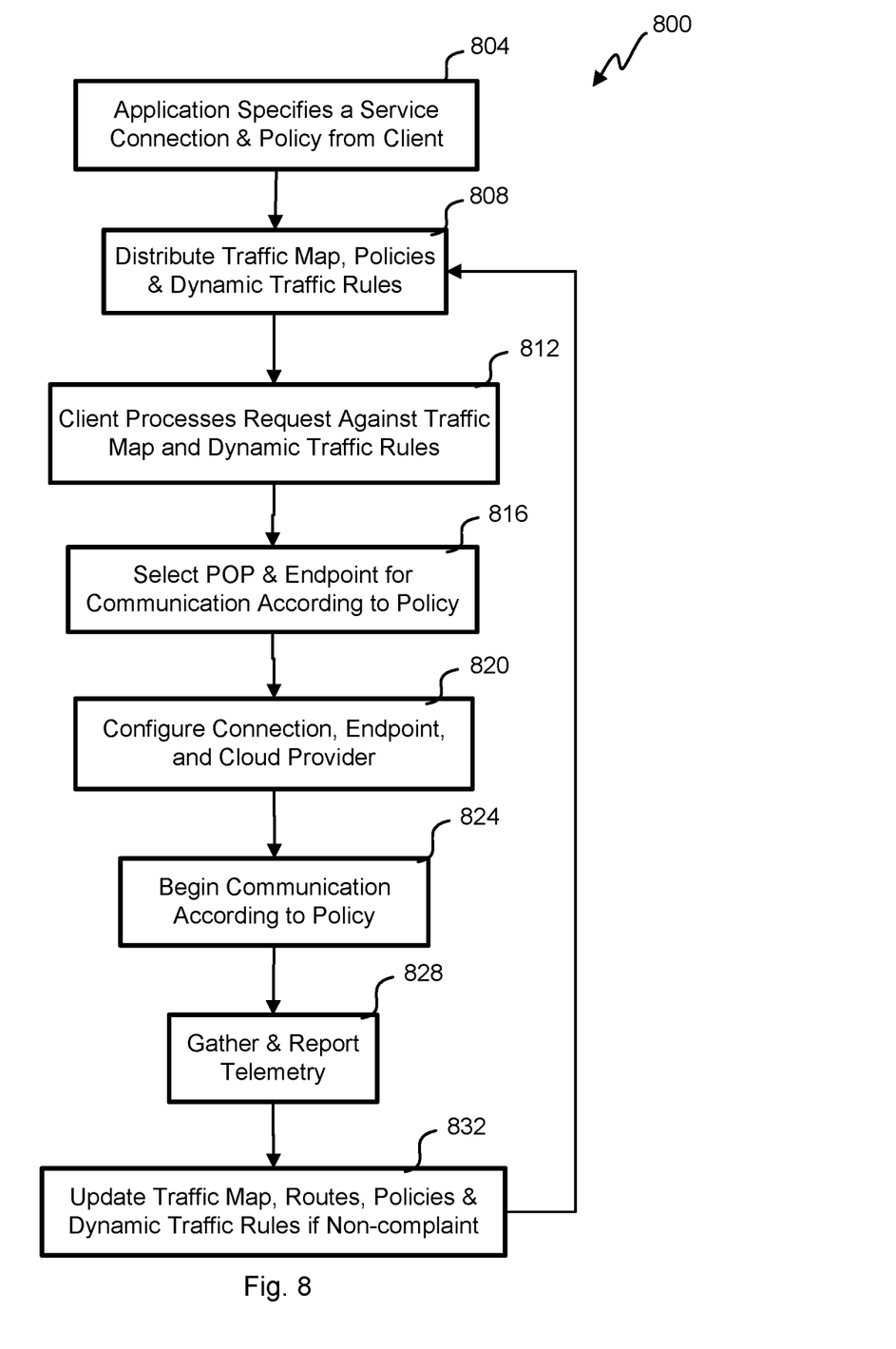
FIG. 8 illustrates a flowchart of an embodiment of a process for policy-driven traffic management in cloud-based multi-tenant systems.

With reference to FIG. 8, a flowchart of an embodiment of a process for policy-driven traffic management in cloud-based multi-tenant systems is shown. The depicted part of the process begins in block 804 where an app 324 interacts with an API 556 for the client 304 to request a connection to a service 216 while specifying any policies 410 for that connection. The policies 410 could be residency, route or performance based. In block 808, the policies 410 and routes 520 are sent from the ARS 185. Traffic rules can be included to switch routes for different conditions. For example, a particular ARS 185 or POP might be used certain times of days or one ARS might get a certain amount of traffic before switching over to another. The traffic rules can be a decision tree with decisions and conditionals that switch between routes. Time of day, utilization, latency or any other performance threshold can be used by the traffic rules to change the route.

In block 812, the client 304 processes the request from block 804 according to the distributed policies, routes and traffic rules. The route to the POP, type of connection (e.g., proxy, tunnel or VPN), and endpoint are selected in block 816. The connection may need configuration of proxies, firewalls, VPNs, etc. along with the cloud provider 140 in block 820. In block 824, communication begins according to the request and any specified policies.

Telemetry is gathered from end user devices 195, the ARS 185 and cloud providers 140 for the assigned route to the requested cloud service. Where any node or link is causing non-compliance according to the threshold in the specified policy, the traffic map 440, route maps 436, and traffic rules may be updated in block 832. Where compliance is not possible, the policies 410 can be updated and distributed to the policy caches 512. Processing then loops back to block 808 where the process repeats. This embodiment allows robust routing according to specified policies that will heal if necessary to stay in compliance.

Figure 9:
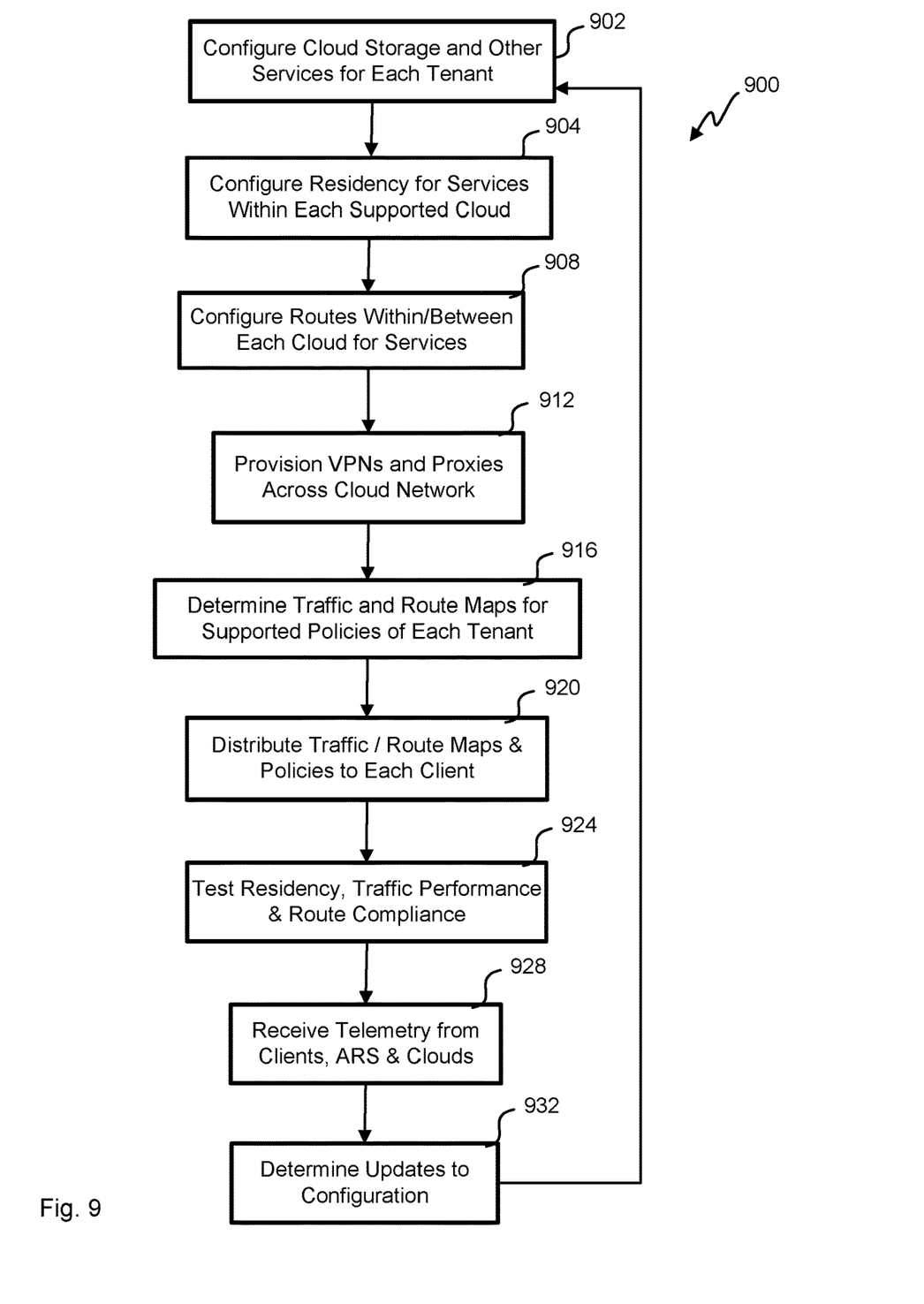
FIG. 9 illustrates a flowchart of an embodiment of a process for policy-driven locality management of routes in cloud-based multi-tenant systems.

Referring next to FIG. 9, a flowchart of an embodiment of a process for policy-driven locality management of routes in cloud-based multi-tenant systems is shown. The depicted portion of the process begins in block 902 where the ARS 185 configures the cloud services with each cloud provider 140 for each tenant. Residency required is configured by the cloud manager 416 in block 904 to support the policies 410 for the various tenants for the various clouds 140. In block 908, routes within and between cloud providers 140 is configured by the cloud manager 416. Various VPNs 190 and proxies are provisioned between ARS 185 and cloud providers 140 across the cloud network 100 in block 912.

Traffic and route maps for supported policies of each tenant are determined in block 916. Traffic and route maps along with policies that are relevant to each end user device 195 are distributed in block 920. Traffic rules could also be included to provide decision support to each client 304. Residency, performance and route is tested in block 924. Testing is performed by the telemetry beacon 252, performance beacon 552 and the sovereignty classifier 424 in block 924. The telemetry is received from clients 304, ARS 185 and cloud providers 140 in block 928. Any updates to the configuration of the cloud network 100 is performed in block 932 to correct any residency issue for routes, services and storage to support the policies of the tenants. After any updates, processing loops back to block 902 where the process begins again.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

In the embodiments described above, for the purposes of illustration, processes may have been described in a particular order. It should be appreciated that in alternate embodiments, the methods may be performed in a different order than that described. It should also be appreciated that the methods and/or system components described above may be performed by hardware and/or software components (including integrated circuits, processing units, and the like), or may be embodied in sequences of machine-readable, or computer-readable, instructions, which may be used to cause a machine, such as a general-purpose or special-purpose processor or logic circuits programmed with the instructions to perform the methods. Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data. These machine-readable instructions may be stored on one or more machine-readable mediums, such as CD-ROMs or other type of optical disks, solid-state drives, tape cartridges, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

The methods, systems, devices, graphs, and tables discussed herein are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims. Additionally, the techniques discussed herein may provide differing results with different types of context awareness classifiers.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate to in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate to in the context of the systems, devices, circuits, methods, and other implementations described herein.

As used herein, including in the claims, "and" as used in a list of items prefaced by "at least one of" or "one or more of" indicates that any combination of the listed items may be used. For example, a list of "at least one of A, B, and C" includes any of the combinations A or B or C or AB or AC or BC and/or ABC (i.e., A and B and C). Furthermore, to the extent more than one occurrence or use of the items A, B, or C is possible, multiple uses of A, B, and/or C may form part of the contemplated combinations. For example, a list of "at least one of A, B, and C" may also include AA, AAB, AAA, BB, etc.

While illustrative and presently preferred embodiments of the disclosed systems, methods, and machine-readable media have been described in detail herein, it is to be understood that the inventive concepts may be otherwise variously embodied and employed, and that the appended claims are intended to be construed to include such variations, except as limited by the prior art. While the principles of the disclosure have been described above in connection with specific apparatuses and methods, it is to be clearly understood that this description is made only by way of example and not as limitation on the scope of the disclosure.

What is claimed is:

1. A cloud-based multi-tenant system for policy-driven locality route-management, the cloud-based multi-tenant system comprising:
   a plurality of routes through the cloud-based multi-tenant system to deliver services to a plurality of end user devices, wherein:
   each route is characterized by one or more of locality and residency,
   the plurality of routes is distributed to the plurality of end user devices in a plurality of domains,
   the plurality of routes terminate with a plurality of cloud services across the Internet,
   the plurality of domains separate subsets of the plurality of end user devices for a plurality of tenants, and
   the plurality of routes are specified for a plurality of policies; and
   an application running on an end user device of the plurality of end user devices that requests a policy chosen from the plurality of policies, wherein:
   a route of the plurality of routes corresponding to the policy is returned,
   communicating via the route between the application and a cloud service is performed according to the policy,
   compliance with the policy is tested for locality and residency,
   telemetry according to the testing is reported, and
   the plurality of routes is updated based upon the telemetry.

2. The cloud-based multi-tenant system for policy-driven locality route-management as recited in claim 1, wherein the application is a web browser.

3. The cloud-based multi-tenant system for policy-driven locality route-management as recited in claim 1, wherein the policy specifies a sovereign to use for the route.

4. The cloud-based multi-tenant system for policy-driven locality route-management as recited in claim 1, wherein the policy specifies a sovereign to avoid for the route.

5. The cloud-based multi-tenant system for policy-driven locality route-management as recited in claim 1, wherein the policy specifies a residency for running the cloud service.

6. The cloud-based multi-tenant system for policy-driven locality route-management as recited in claim 1, wherein the policy specifies a residency to avoid for running the cloud service.

7. The cloud-based multi-tenant system for policy-driven locality route-management as recited in claim 1, wherein the policy specifies a group of countries to avoid for the route.

8. A method for policy-driven locality management of routes in cloud-based multi-tenant systems, the method comprising:
   determining a plurality of routes through a cloud-based multi-tenant system to deliver services to a plurality of end user devices, wherein each route is characterized by one or more of locality and residency;
   distributing the plurality of routes to the plurality of end user devices in a plurality of domains, wherein:
   the plurality of routes terminate with a plurality of cloud services across the Internet,
   the plurality of domains separate subsets of the plurality of end user devices for a plurality of tenants, and
   the plurality of routes are specified for a plurality of policies;
   receiving from an application running on an end user device of the plurality of end user devices selection of a policy chosen from the plurality of policies;
   returning a route of the plurality of routes corresponding to the policy; and
   communicating via the route between the application and a cloud service according to the policy;
   testing compliance with the policy;
   reporting telemetry according to the testing; and
   updating the plurality of routes based upon the telemetry.

9. The method for policy-driven locality management of routes in cloud-based multi-tenant systems as recited in claim 8, wherein the policy specifies a sovereign to avoid for the route.

10. The method for policy-driven locality management of routes in cloud-based multi-tenant systems as recited in claim 8, wherein the policy specifies a sovereign to use for the route.

11. The method for policy-driven locality management of routes in cloud-based multi-tenant systems as recited in claim 8, wherein the policy specifies a sovereign to avoid for the route.

12. The method for policy-driven locality management of routes in cloud-based multi-tenant systems as recited in claim 8, wherein the policy specifies a residency for running the cloud service.

13. The method for policy-driven locality management of routes in cloud-based multi-tenant systems as recited in claim 8, wherein the policy specifies a residency to avoid for running the cloud service.

14. The method for policy-driven locality management of routes in cloud-based multi-tenant systems as recited in claim 8, wherein the policy specifies a group of countries to avoid for the route.

15. A cloud-based multi-tenant system for policy-driven locality route-management, the cloud-based multi-tenant system comprising one or more processors and one or more memories with code for:
   determining a plurality of routes through the cloud-based multi-tenant system to deliver services to a plurality of end user devices, wherein each route is characterized by one or more of locality and residency;
   distributing the plurality of routes to the plurality of end user devices in a plurality of domains, wherein:
   the plurality of routes terminate with a plurality of cloud services across the Internet,
   the plurality of domains separate subsets of the plurality of end user devices for a plurality of tenants, and
   the plurality of routes are specified for a plurality of policies;
   receiving from an application running on an end user device of the plurality of end user devices selection of a policy chosen from the plurality of policies;
   returning a route of the plurality of routes corresponding to the policy; and
   communicating via the route between the application and a cloud service according to the policy;
   testing compliance with the policy;
   reporting telemetry according to the testing; and
   updating the plurality of routes based upon the telemetry.

16. The cloud-based multi-tenant system for policy-driven locality route-management as recited in claim 15, wherein the policy specifies a sovereign to avoid for the route.

17. The cloud-based multi-tenant system for policy-driven locality route-management as recited in claim 15, wherein the policy specifies a sovereign to use for the route.

18. The cloud-based multi-tenant system for policy-driven locality route-management as recited in claim 15, wherein the policy specifies a sovereign to avoid for the route.

19. The cloud-based multi-tenant system for policy-driven locality route-management as recited in claim 15, wherein the policy specifies a residency for running the cloud service.

20. The cloud-based multi-tenant system for policy-driven locality route-management as recited in claim 15, wherein the policy specifies a residency to avoid for running the cloud service.

\* \* \* \* \*